United States Patent [19]

Hilton et al.

[11] Patent Number: 4,553,846

[45] Date of Patent: Nov. 19, 1985

[54] OPTICAL DETECTION SYSTEM FOR FEATURES ON A SHEET OR WEB

[75] Inventors: Graham H. Hilton, Hants; Barry J. Curl, Southampton, both of England

[73] Assignee: De La Rue Systems Limited, London, England

[21] Appl. No.: 500,241

[22] Filed: Jun. 1, 1983

[30] Foreign Application Priority Data

Jun. 1, 1982 [GB] United Kingdom ............... 8215978

[51] Int. Cl.$^4$ .................... G01N 21/86; G02B 5/14
[52] U.S. Cl. ................................. 356/429; 250/227; 356/430
[58] Field of Search ............. 356/429, 430, 71; 250/559, 560, 571, 561, 556, 227, 548, 557

[56] References Cited

U.S. PATENT DOCUMENTS

| | | | |
|---|---|---|---|
| 3,005,106 | 10/1961 | Wilkins | 250/556 X |
| 3,658,430 | 4/1972 | Rashkin | 250/561 X |
| 3,718,823 | 2/1973 | Niikura et al. | 250/561 X |
| 3,746,451 | 7/1973 | Croissant et al. | 356/430 X |
| 3,835,332 | 9/1974 | Bridges | 356/430 X |
| 4,110,627 | 8/1978 | Isherwood | 250/561 OR |
| 4,352,022 | 9/1982 | Britton | 250/561 OR |

*Primary Examiner*—Vincent P. McGraw
*Assistant Examiner*—Robert Thompson
*Attorney, Agent, or Firm*—Cushman, Darby & Cushman

[57] ABSTRACT

In an optical detection system for detecting a feature located at a predetermined lateral position on a banknote, for example, the banknote is moved along a flow path and a series of light receivers are arranged transversely across that portion of the flow path which the feature is expected to occupy, so that different ones of the light receivers will respond to the feature in the banknote depending on the lateral offset of the banknote at that portion of the flow path. The margins of the note are utilized in the detection system to gate the said light receivers so that for any position of lateral offset of the banknote only that light receiver which responds to the said feature of the banknote will produce an effective output signal. In the embodiment of FIG. 1, two sets of fibre optics are used to effect this gating, one set having its first ends (S1 to S5) opposite a light source at one margin of the sheet and its other ends (F1 to F5) adjacent the above mentioned light receivers (F1' to F5'). The said light receivers are constituted by first ends of the second set of fibre optics, the other ends (D1 to D5) of which provide light output for a detector at the other margins of the notes. An electronic gating system is also disclosed (FIG. 2).

5 Claims, 3 Drawing Figures

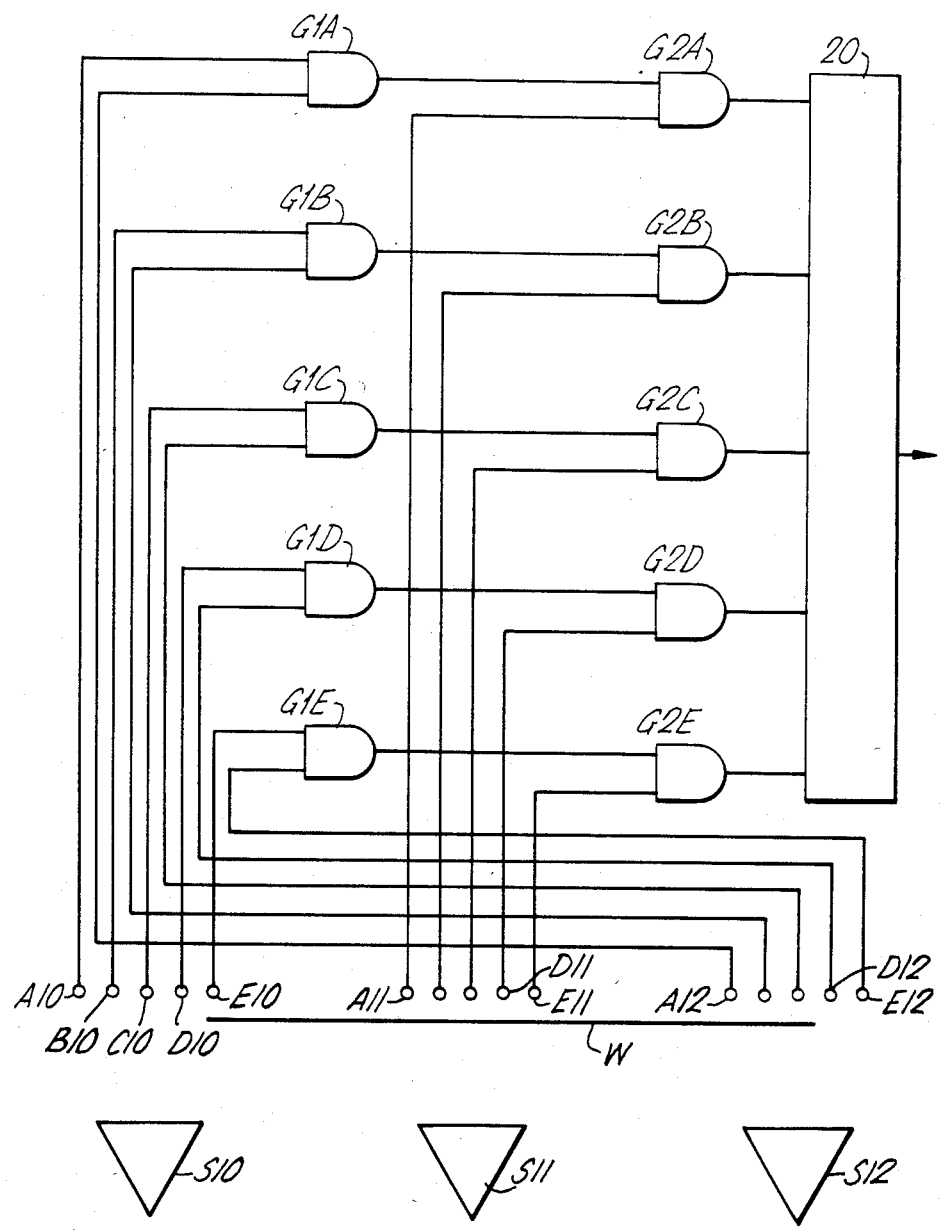
Fig. 2.
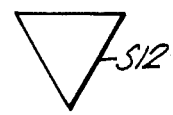

OPTICAL DETECTION SYSTEM FOR FEATURES ON A SHEET OR WEB

The present invention concerns an optical detection system for detecting features located at a predetermined lateral position on a sheet or web, and is particularly useful for detecting features printed on banknotes.

Conventional apparatus for detecting the passage of a feature on a banknote consists of an optical detector positioned over the expected lateral position of the feature as the banknote is transported past the detector. This system works satisfactorily if the feature to be detected is comparatively large, but smaller features cannot be detected reliably because of variations in the lateral position of the banknote as it passes the detector, caused when the banknote is laterally displaced or skewed.

An optical detection system in accordance with the invention for detecting a feature located at a predetermined lateral position on a sheet or web fed along a flow path comprises: a first row of spaced light receivers extending transverse to the direction of feed and positioned so that the row crosses the path of the feature which is required to be sensed, whereby light from the said feature will be received by one of the first row of receivers, depending on the lateral position of the sheet or web relative to the nominal flow path; output means adapted to provide an output signal in accordance with light received by any of the receivers of the said first row; and gating means co-operating with the sheet or web according to its lateral position relative to the flow line for selectively blocking the response of the output means to all but one of the receivers of the first row, the gating means including means providing, at each margin of the nominal flow path, a number of light paths which in the absence of the sheet or web pass through the plane of the flow path, the number of light paths at each margin being equal to the number of light receivers in the said first row and the spacing of the light paths being equal to the spacing of the light receivers of the first row, the sheet or web when present selectively blocking some light paths at one of the margins and other light paths at the other of the margins in accordance with the lateral position of the sheet relative to the nominal flow path and thereby controlling the selective action of the gating means to determine to which of the receivers of the first row the output means will respond.

In the preferred optical detection system, the gating means comprises a source of light on one side of the plane of the flow path and at one margin of the nominal flow path; a light detector on one side of the plane of the flow path and at the other margin of the nominal flow path; a first set of fibre optics, the fibre optics at one end forming a row at one margin of the nominal flow path for receiving light from the said source and at the other end providing light for illuminating elements of the sheet or web seen by the said light receivers of the first row; and a second set of fibre optics, the fibre optics at one end of the second set constituting the first row of spaced light receivers and the fibre optics at the other end of the second set being spaced at the other margin of the nominal flow path to provide light for the light detector. In this way, it is arranged that the light paths provided by the two sets of fibre optics are effectively in series, the light entering the fibre optics of the first set unless obscured by the edge of the sheet, and illuminating an intermediate region of the sheet containing the required feature and then entering the fibre optics of the second set, from the remote ends of which light passes to the photo-electric means unless interrupted by the other side of the sheet or web. The arrangement is such that all light paths through the photo-electric means except that one which includes the feature to be sensed are interrupted by one or other of the two sides (margins) of the sheet or web. Although we prefer to use two sets of fibre optics, as disclosed above, it is also possible to provide electronic gating means; in this case, the detection system comprises first, second and third sources of light, the first source being located on one side of the plane of the flow path and at a first margin of the flow path, the second source being located on one side of the plane of the flow path and at the second margin of the flow path, and the third source being located on one side of the flow path in a position such that the required feature of the sheet or web will be illuminated during its passage past the light source; first, second and third sets of light sensors, each located on a side of the plane of the flow path opposite a corresponding light source, each set comprising a number of equally spaced sensors arranged in a row extending transversely to the direction of feed, whereby light from the said feature will reach one of the sensors of the third set, depending on the lateral position of the web or sheet relative to the nominal flow path and the passage of light to sensors of the first and second sets will be selectively blocked by the respective margins of the web or sheet, according to its said lateral position; and gating means responsive to the outputs of the first and second sets of sensors to gate the outputs of the third set of sensors so that only the output of that sensor receiving light from the required feature will be transmitted.

In order that the invention may be better understood, two embodiments of the invention will now be described with reference to the accompanying drawings, wherein:

FIG. 2 is a circuit diagram of an electronic gating system embodying the invention.

A banknote W is assumed to have a feature F printed on its surface in correct lateral registration with the banknote edges. Thus the perpendicular distance from the feature F to the right-hand edge of the banknote is expected to be exactly the same for all banknotes passing through the system. The purpose of the invention is to use the edges of the banknote to gate the response of an array of sensors in order that they may follow the feature F in a lateral direction. If the banknote W is laterally displaced or slightly skewed as it passes through the detection system, the lateral position of the feature F, denoted by x in FIG. 1a, changes in the same way that the positions of the edges of the banknote change. The edges of the banknote gate the sensors in such a way that the only active channel is the one that causes light to be reflected from the portion of the banknote surface through which the feature F is expected to pass.

Figure 1A:
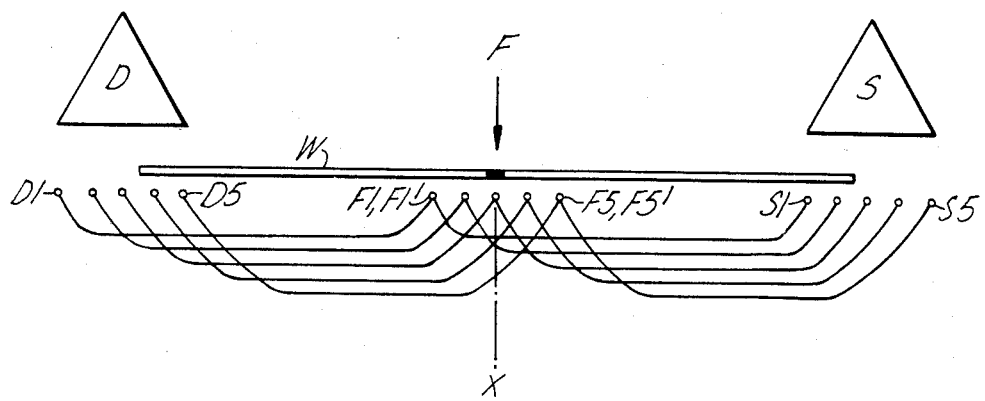
FIG. 1a is a schematic diagram of the optical detection system in a plane perpendicular to the face of a banknote passing through the system.
Figure 1B:
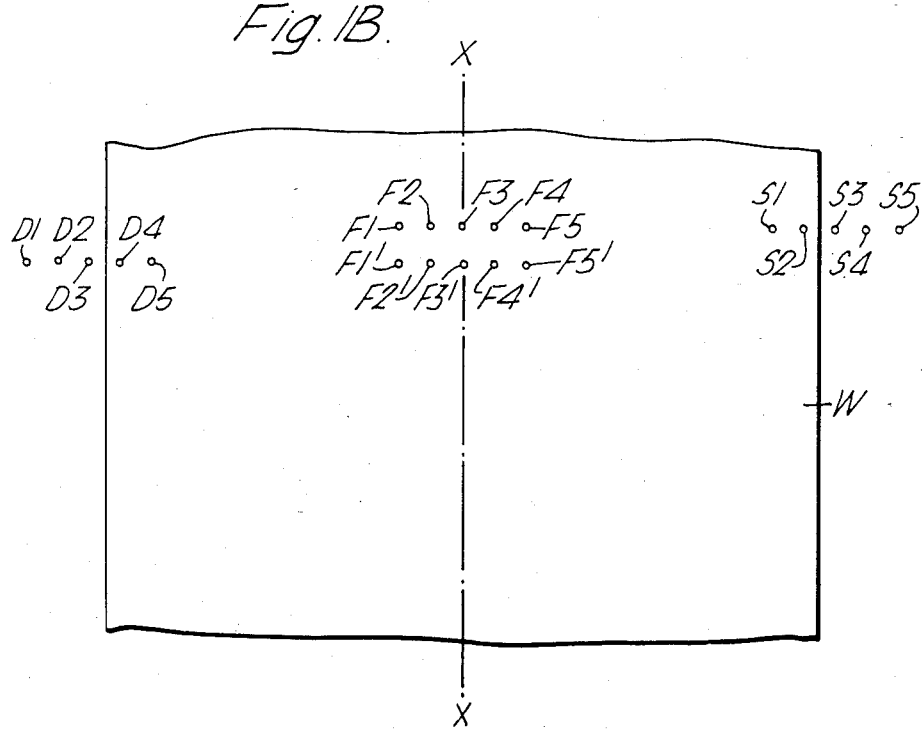
FIG. 1b is a sketch in the plane of the banknote of FIG. 1a, showing the optic ends at the edges and the central portion of the banknote.

Referring now to FIG. 1a, the banknote W is transported lengthwise through the detection system, which comprises a broad-band source of illumination S arranged over the right-hand edge of the banknote, and an optical detector D arranged to collect light from the opposite edge of the banknote. The system is so arranged that light cannot pass directly between the source S and the detector D. Depending on the position of the right-hand edge of the banknote, light from the source S is received by one or more of the first ends S1, S2, S3,S4 and S5 of a first set of five optical fibres (FIG. 1b). These first ends of the first set of optical fibres occupy a region overlapping the right hand edge of the banknote. The other ends F1, F2,F3,F4 and F5 of the first set of optical fibres, respectively, are arranged adjacent an intermediate region of the banknote flowpath through which the feature F of interest will pass. Light emerging from any of these optical fibre ends is reflected in a corresponding area of the banknote and is collected by the first ends F1',F2',F3', F4' and F5' of a second set of optical fibres in this intermediate region. The other ends of this second set of optical fibres overlap the edge of the banknote in a region at its left-hand margin. Within each of the said regions, the ends of the optical fibres are co-linear and equally spaced. Moreover, the separation between the optical fibre ends in the lateral direction, i.e. the direction perpendicular to the direction of travel of the banknote, is the same for all three regions; thus, for example, the separation of D1 and D2 is equal to the separation of F2 and F3.

With the banknote in the position shown in FIGS. 1a and 1b, light from the source S enters only three of the five optical fibres of the right-hand edge region. The optical channel comprising the fibres connecting S1 with F1 and F1' with D1, and the optical channel connecting S2-F2 and F2'-D3, are thus inoperative because the optical fibre ends S1 and S2 are obscured by the right-hand edge of the banknote. Moreover, light from the fibres comprising the left-hand region is only capable of reaching the detector D from the ends D1,D2 and D3, since the left-hand edge of the banknote obscures the light from the optical fibre ends D4 and D5. Thus the fourth and the fifth optical channels, ending at D4 and D5 are inoperative on account of the left-hand edge of the banknote. The only active channel is therefore the third channel, i.e. the channel connecting S3,F3,F3' and D3.

The active third channel reflects light in an area of the banknote defined by the line X—X in FIG. 1b, and this is the line on which the feature F is expected to lie. Thus the edges of the banknote have successfully gated the response of the five sensors such that only one of them (defined by the third channel) is responsive. If the banknote were moved to the left or to the right, the light reaching the detector D would still come from reflection in the line X—X, i.e. from the feature F, because the corresponding optical channel would be active. For example, if the banknote were moved to the right by a distance corresponding to the separation between adjacent optical fibre ends, then the right-hand edge would obscure S1,S2 and S3, the left-hand edge would obscure only D5, and the fourth channel only would be active. This would result in the ends F4, F4' being used to illuminate and receive reflected light from the banknote, which correctly follows the rightward movement of the feature F.

It is of course only necessary to use one photodetector in the detector D, since light collected from the left-hand region is expected to come from only one channel, and no further discrimination is necessary. A signal derived from this photodetector then represents the variations in reflectivity of the banknote along the line X—X, and incorporates the feature F lying on that line.

Thus, in the example described above the fibre optic ends F1' to F5' constitute a row of spaced light receivers extending transverse to the direction of feed and crossing the path of the feature to be sensed, so that light from the feature will be received by one of this row depending on the lateral position of the web. The detector D constitutes an output means for receiving light from the light receivers F1' to F5'; and the fibre optic ends S1 to S5, the source, the fibre optic ends D1 to D5 and the detector, act in co-operation with the web as a gating means to block the response of the detector to all but one of the receivers F1' to F5'.

It will be appreciated that the example given in FIGS. 1a and 1b is given only by way of illustration. There could be any number of optical channels, greater than one, and the greatest accuracy comes from using optical fibres closest together. If a large variation in the lateral position of the banknote feature F is expected, then a correspondingly large number of optical channels will be required to accommodate this and to be able to follow the desired feature F. If more than one feature is to be followed, then several such systems could be employed in parallel.

The system described above uses reflected light, but it is equally feasible to use light transmitted through the banknote. Referring then to FIG. 1b, the ends F1 to F5 of one set of optical fibres would be arranged on one face of the banknote, and the corresponding ends F1' to F5' of the other set of optical fibres would be arranged on the opposite face.

FIG. 2 illustrates an electronic gating arrangement embodying the invention. In this arrangement light sources S10, S11 and S12 are arranged on one side of the plane of the flow path for the note W, source S11 being positioned to illuminate the feature of interest on the note and sources S10 and S12 lying partially under the margins of the note flow path, for a normal note position. On the other side of the plane of the flow path there are three groups each of five photodetectors, a group A10 to E10 facing the source S10, a group A11 to E11 facing the source S11,a group A12 to E12 facing the source S12.

In the normal position of a sheet on the flow path, (i.e. shifted to the left from the position shown in FIG. 2) photodetectors D10 and E10 are prevented from receiving light from source S10 by the left-hand margin of the note W and photodetectors A12 and B12 are prevented from receiving light from source S12 by the right-hand margin of the note. These lateral groups of photodetectors are coupled in pairs to 5 AND gates G1A to G1E. Thus, photodetectors A10 and A12 provide the inputs for gate G1A, photodetectors B10 and B12 provide the inputs for gate G1B, and so on. It will be seen that as a total of 4 photodetectors are obscured at the two margins of the sheets, only one AND gate will have a logic 1 at both its inputs. (It is assumed that unobscured light channels produce a logic "1" output). With the sheet in its normal position, the gate in question will be G1C. However, for the condition shown in the diagram, where the note has moved slightly to the right, the gate having the two "1" inputs is the gate G1D.

The outputs of gates G1A to G1E are applied respectively to inputs of AND gates G2A to G2E. The other inputs of these gates are connected respectively to photodetectors A11 to E11. Thus, for the example shown, only gate G2D will have a "1" at its first input. As the note has moved to the right, the feature of interest which is under photodetector C11 for the normal note position is now under photodetector D11. It is assumed that this feature is such that D11 is illuminated when the feature is present, causing a logical "1" output from D11. In this case, gate G2D will pass a logical "1" signal to the output circuit 20. It will be seen that as the note moves laterally, so the operative gates "follow" the movement, and the circuit 20 always receives the appropriate signal.

Whilst lateral offset of the banknote at the region containing the feature of interest may be due to skew, it is to be understood that the angle of skew is not expected to be such that the slant length of the banknote, in the direction of the rows of fibre optic ends or of photoelectric devices (FIG. 2) exceeds the width of the note by more than the pitch between the fibre optic ends or photodetectors.

We claim:

1. An optical detection system for detecting a feature located at a predetermined lateral position on a sheet or web fed along a flow path, comprising:
    a first row of spaced light receivers extending transverse tothe direction of feed and positioned so that the row crosses the path of the feature which is required to be sensed, whereby light from the said feature will be received by one of the first row of receivers, depending on the lateral position of the sheet or web relative to the nominal flow path;
    output means adapted to provide an output signal in accordance with light received by any of the receivers of the said first row;
    and gating means co-operating with the sheet or web according to its lateral position relative tothe flow line for selectively blocking the response of the output means to all but one of the receivers of said first row, said gating means including means providing, at each margin of the nominal flow path, a number of light paths which in the absence of the sheet or web pass through the plane of the flow path, the number of light paths at each margin being equal to the number of light receivers in the said first row and the spacing of the light paths being equal to the spacing of the light receivers of the first row, the sheet or web when present selectively blocking some light paths at one of the margins and other light paths at the other of the margins in accordance with the lateral position of the sheet relative to the nominal flow path and thereby controlling the selective action of the gating means to determine to which of the receivers of the first row the output means will respond.

2. An optical detection system in accordance with claim 1, in which the gating means comprises:
    at one margin of the flow path a source of light on one side of the plane of the flow path and a second row of light receivers on the other side of the plane of the flow path, said second row of light receivers being equal in number and spacing to the light receivers of the first row;
    a row of light transmitters, equal in number and spacing to the light receivers of the first row, coupled to and controlled by respective light receivers of the second row and illuminating elements of the sheet or web seen by the respective receivers of the first row;
    and at the other margin a photo-sensitive means on one side of the plane of the flow path and a second row of light transmitters equal in number and spacing to the light receivers of the first row on the other side of the plane of the flow path, said second row of light transmitters being coupled to and responsive to the outputs of respective light receivers of the first row, and directing light across the plane of the flow path to said photosensitive means.

3. An optical detection system in accordance with claim 1, in which the gating means comprises:
    a source of light on one side of the plane of the flow path and at one margin of the nominal flow path;
    a light detector on one side of the plane of the flow path and at the other margin of the nominal path;
    a first set of fibre optics, the fibre optics at one end forming a row at one margin of the nominal flow path for receiving light from the said source and at the other end providing light for illuminating elements of the sheet or web seen by the said light receivers of the first row;
    and a second set of fibre optics, the fibre optics at one end of the second set constituting said first row of spaced light receivers and the fibre optics at the other end of the second set being spaced at the other margin of the nominal flow path to provide light for the light detector.

4. An optical detection system for detecting a feature located at a predetermined lateral position on a sheet or web fed along a flow path, comprising: a source of light on one side of the plane of the flow path and at a first margin of the flow path;
    a detector on one side of the plane of the flow path and at the second margin of the flow path;
    a first set of fibre optics, one end of the first set of fibre optics forming a first row of fibre optic ends extending transversely to the direction of feed at the first margin of the flow path and on the side of the plane of the flow path opposite the source, for receiving light from the source, the other ends of the first set of fibre optics being arranged in a second row parallel to the first row and providing light for illuminating elements of the sheet or web and crossing the path of the feature which is required to be sensed;
    and a second set of fibre optics, one end of which forms a row of fibre optics parallel to the first row for receiving light from the elements of the sheet or web illuminated with light from the first set of fibre optics, the other ends of the second set of fibre optics forming a row of fibre optic ends parallel to the first row at the second margin of the flow path, to provide light for the light detector;
    the passage of the sheet or web blocking the passage of light from the source to selected ones of the first set of fibre optics and the passage of light toward the detector from selected ones of the second set of fibre optics, according to the lateral position of the web relative to the nominal flow path, whereby when the said feature crosses the transverse rows of fibre optic ends, the detector will receive light only from the element of the sheet or web containing the required feature, irrespective of lateral error in the web or sheet position.

5. An optical detection system for detecting a feature located at a predetermined lateral position on a sheet or web fed along a flow path, comprising:

first, second and third sources of light, the first source being located on one side of the plane of the flow path and at a first margin of the flow path, the second source being located on one side of the plane of the flow path and at the second margin of the flow path, and the third source being located on one side of the flow path in a position such that the required feature of the sheet or web will be illuminated during its passage past the light source;

first, second and third sets of light sensors each located on a side of the plane of the flow path opposite a corresponding light source, each set comprising a number of equally spaced sensors arranged in a row extending transversely to the direction of feed;

whereby light from the said feature will reach one of the sensors of the third set, depending on the lateral position of the web or sheet relative to the nominal flow path and the passage of light to sensors of the first and second sets will be selectively blocked by the respective margins of the web or sheet, according to its said lateral position;

and gating means responsive to the outputs of the first and second sets of sensors to gate the outputs of the third set of sensors so that only the output of that sensor receiving light from the required feature will be transmitted.

* * * * *